Dec. 25, 1962 J. R. BROWN, JR., ET AL 3,070,800

MAGNETIC TAPE TIMING SYSTEM

Filed Oct. 28, 1958

2 Sheets-Sheet 1

INVENTOR.
JOSEPH REESE BROWN, JR.
DAVID H. HARTKE
BY
Christie, Parker & Hale
ATTORNEYS INVENTOR.
JOSEPH REESE BROWN, JR.
DAVID H. HARTKE
BY
Christie, Parker & Hale
ATTORNEYS United States Patent Office 3,070,800
Patented Dec. 25, 1962

3,070,800

MAGNETIC TAPE TIMING SYSTEM

Joseph Reese Brown, Jr., Pasadena, and David H. Hartke, Glendora, Calif., assignors to Burroughs Corporation, Detroit, Mich., a corporation of Michigan
Filed Oct. 28, 1958, Ser. No. 770,219
4 Claims. (Cl. 346—74)

This invention relates to magnetic tape digital storage systems, and more particularly, is concerned with the recording of digital information on magnetic tape.

It is well known to use magnetic tape for bulk storage of digital information for use in electronic digital computers and other types of electronic data processing equipment. Magnetic tape has the advantage that it can store a large quantity of information in a readily usable form and the information can be readily modified to update the information stored. It is desirable practice in the use of magnetic tape for bulk storage to arrange the information in blocks, which blocks can be addressed in some well-known manner. This permits scanning of the tape at high speed to locate a block of information and then transferring the block to a high speed memory where it is readily accessible to a computer or other associated data processing system. It is desirable of course to pack the blocks as closely together on the tape as possible, thus allowing a minimum of wasted space between blocks of information. A suitable transport apparatus for achieving close spacing of block information on magnetic tape storage is described in copending application Serial No. 620,070, filed November 2, 1956, and assigned to the assignee of the present invention.

One problem encountered in providing close spacing between blocks of information arises in the rewriting of selected blocks of information. Any variation in tape speed during the rewrite operation results in a variation in the physical length of the block, assuming information is read in at a fixed clock frequency from the digital source. If a block is rewritten at a slightly slower speed than at the time of the original writing, the block length may be increased to the point that the rewritten information extends over into the next block, thereby partially destroying information in the next block on the tape.

One obvious way of avoiding this problem is to use a carefully regulated tape drive for maintaining the taped speed constant. Thus it has been the general practice to use a synchronous motor controlled from a regulated frequency source. A separate power supply having frequency and voltage regulation could be used in combination with a hysteresis synchronous motor. Such an arrangement is of course complex and costly. A more desirable solution is to use a synchronous motor driven from a conventional 60 cycle power source. However, two sources of speed variation may arise, namely, variations in line frequency and line voltage transients. A change in frequency of $\pm 1$ cycle at a normally 60 cycle source produces a $\pm 1.7\%$ speed variation in the hysteresis motor. Even more serious is the problem of line voltage transients which may produce instantaneous speed variations of as much as $\pm 2\%$, even with the most elaborately stabilized synchronous motors.

The problem of variations in block length with change in drive speed is particularly acute where variable length blocks are used. For example, if a maximum block length of 6 inches is assumed, a speed variation of $\pm 3\%$ would require an allowance of .4 inch between blocks to prevent the possibility of a rewritten block extending into the next block. If it is assumed a minimum block length of .6 inch in the tape is filled with minimum length blocks, it will be seen that only 60% of the tape is available for useful information, the remainder being used up in spaces between blocks.

By the present invention it is possible to rewrite information in such a manner that the rewritten block cannot take up a greater length of tape than that occupied by the previous block of information. Thus no space need be provided between blocks on the tape to allow for possible variations in block length during a rewriting or updating procedure. This is accomplished, in brief, by providing a tape data storage system in which the tape transport includes a motor for driving the tape, and means driven by the motor for generating clock pulses having a frequency determined by the rate of rotation of the motor. Information is transferred from a source of digital information and written on the tape in synchronism with the clock pulses. In this manner a change in tape speed is accompanied by a corresponding change in the transfer rate of digital information to the tape, the result being a constant density recording, independent of the tape drive speed.

For a more complete understanding of the invention, reference should be had to the accompanying drawings, wherein.

Figures 1, 2:
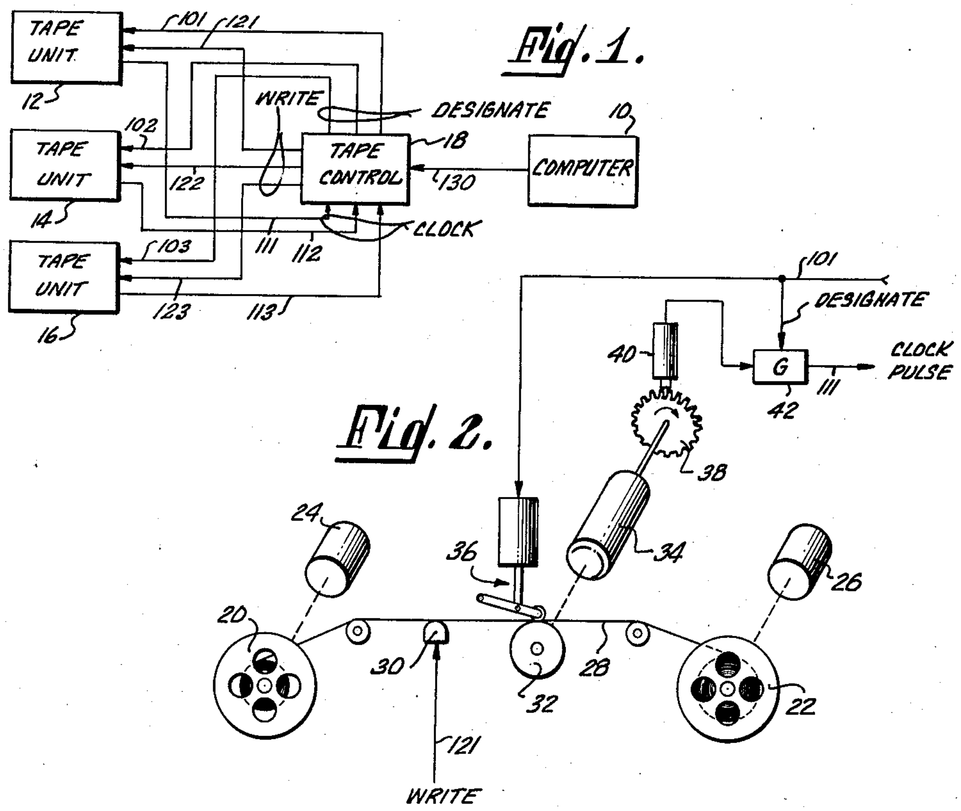
FIG. 1 is a block diagram of a multiple tape system.
FIG. 2 is a schematic showing of a tape transport unit.

Referring to FIG. 1, the numeral 10 indicates generally a digital computer or other data processing system which provides a source of pulse-code digital information. The computer 10 is arranged to transfer blocks of information to any one of a plurality of tape storage units, indicated at 12, 14, and 16, through a suitable tape control unit 18. The tape control unit includes temporary storage from which information can be transferred as desired to a selected one of the tape storage units when a selected portion of the tape in the tape unit passes under the writing head.

Referring to FIG. 2, a portion of a suitable tape storage unit including the tape transport is shown. The tape transport typically includes a supply reel 20 and a takeup reel 22 driven by suitable reel motors 24 and 26 respectively. Magnetic tape 28 extends between the two reels, passing over a magnetic recording head 30 and a drive capstan 32. Capstan 32 is driven from a motor 34 which receives power from an alternating current source (not shown). The tape is engaged with the capstan 32 by a conventional solenoid-operated pinch roller arrangement indicated generally at 36.

Figure 3:
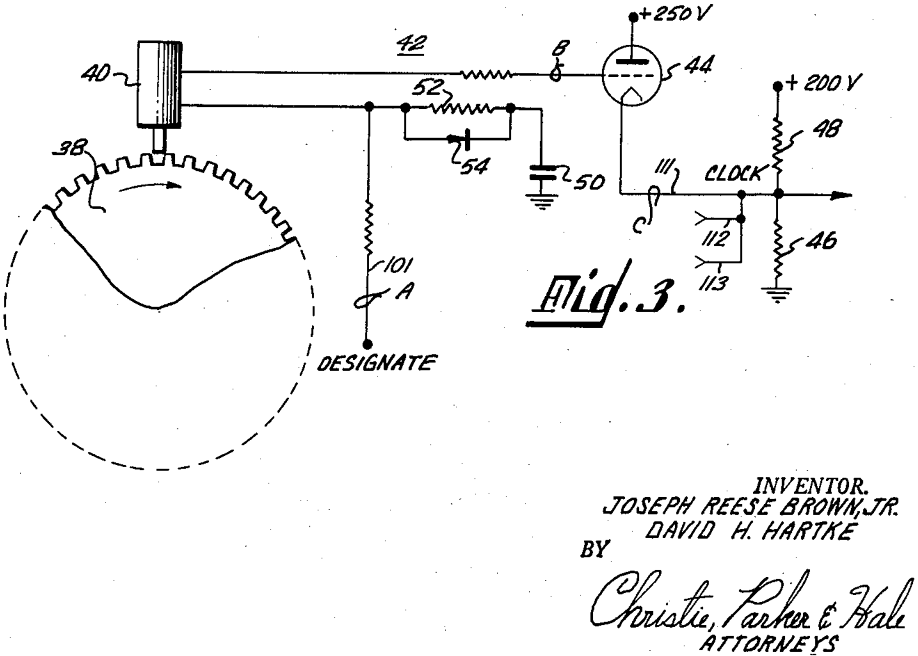
FIG. 3 is a schematic diagram of the clock signal generator.

The capstan drive motor 34 is provided with a notched wheel 38 made of steel or other magnetic material which is rotated by the motor past a magnetic pickup device 40. The signal from the pickup device 40 is gated out by a suitable gating circuit 42 whenever a Designate signal is applied to the pinch roller unit 36. The magnetic pickup 40 and associated gating circuit 42 are shown in more detail in FIG. 3 which also shows an enlarged portion of the notched wheel 38. The notched wheel 38 may be in the form of a steel timing gear mounted on the motor shaft, with the teeth of the gear passing beneath the reluctance pickup head 40. When the teeth of the gear pass the pickup head, a signal of approximately sine wave shape is induced in the coil of the pickup head 40.

For successful operation of multiple tape storage units, tape control unit 18 must provide for rapid switching from one tape storage unit to another. The signal from the designated storage unit only must be sent to the clock pulse generator. The signal must be applied to the pulse generator in such a way that all output pulses have correct timing. No half pulses or random pulses can be tolerated in the system. A signal from the designated tape storage unit must be capable of being interrupted in less than a period between successive clock pulses. Gating circuit 42 provides these desired properties.

The gating circuit 42 associated with each tape storage unit includes a cathode follower stage including a triode 44 and a cathode load resistor 46 which is common to the cathode follower stages in the gates of all the tape storage units. A proper bias level is provided by common bias resistor 48, the resistors 46 and 48 being connected across a positive potential source. A pickup is connected directly to the grid of the cathode follower tube 44.

Figure 6:
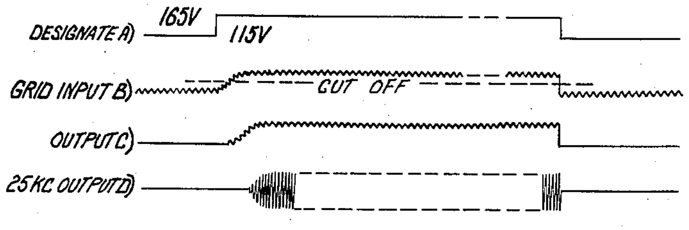
FIGS. 6 and 7 are diagrammatic showings of the waveforms in the identified portions of the circuits of FIGS. 3 and 4.

A voltage level is applied by means of the Designate line 101 to the return side of the coil 40. The Designate voltage level is one or the other of two values such as may be derived from a flip-flop (not shown) in the tape control unit 18, the waveform of the Designate signal being shown in FIG. 6A. A network is provided including a capacitor 50 and a charging resistor 52 shunted by a diode 54. Thus as a pedestal or step voltage resulting from a change to a high level from a low level voltage is applied to the Designate terminal, the bias level on the grid of the tube 44 slowly rises at a rate determined by the charging of the capacitor 50 through the resistor 52. When the Designate voltage level is dropper or stepped down again, the capacitor discharges much more rapidly through the relatively low impedance of the diode 54, thus providing an abrupt cutoff of the tube 44. The A.C. signal generated by the coil 40 is superimposed on the pedestal voltage provided by the Designate input, producing an output signal at the cathode of the tube 44 as shown in FIG. 6C. Only the gate 42 of the designated tape storage unit provides a timing signal to the pulse generator of the tape control unit 18.

Figure 4:
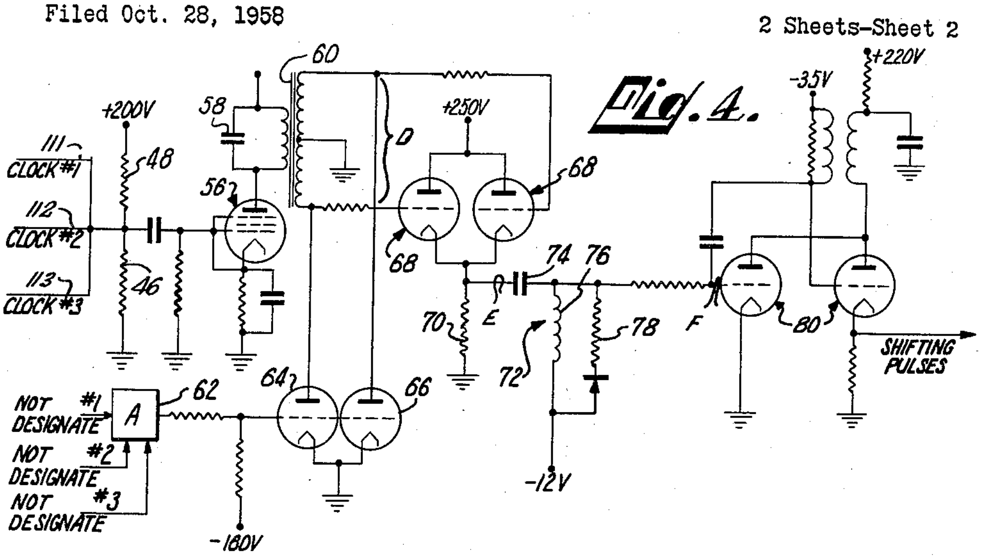
FIG. 4 is a schematic wiring diagram of a clock pulse generator.

Referring to FIG. 4, a signal from the selected tape storage unit is coupled to a single stage of amplification indicated generally at 56 which includes a tuned plate load. The tuned circuit includes a capacitor 58 and the primary inductance of a transformer 60 and is resonated at the frequency of the clock signal.

Since the Q of the resonance is made relatively high, it is necessary to provide means for damping oscillation quickly when switching from one tape storage unit to another. This is accomplished by sensing the Not Designate condition of the tape storage unit selecting flip-flops in the tape control unit 18. If no tape unit is designated, each of the Not Designate lines will be at a high potential level, producing a high potential level at the output of an "and" circuit 62. This raises the bias above cutoff in a pair of triode tubes 64 and 66, the plates of which are connected respectively to opposite ends of the secondary of the transformer 60. Thus during the time between designations of one tape storage unit and another tape storage unit, a low impedance shunting path is provided across the secondary of the transformer 60 thereby damping out oscillation of the resonant circuit in the plate load of the amplifier 56.

Figure 7:
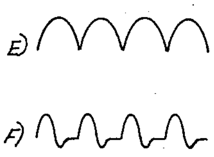

The push-pull signal presented by the center-tapped secondary of the transformer 60 is preferably fed to a rectifier stage indicated generally at 68. The rectifier stage includes a pair of cathode followers with a common cathode resistor 70. The two cathode follower tubes are operated close to cutoff so that while the grid of one tube goes positive the other becomes cut off, thus producing a full wave rectified signal across the resistor 70, the wave form of which is indicated in FIG. 7E.

The output drive from across the resistor 70 is applied to a pulse shaping network indicated generally at 72, which includes a capacitance 74 and an inductance 76, the inductance being shunted by a diode 78. The circuit 72 provides a half-cycle pulse at the end of each half cycle of the full wave rectified signal across the resistor 70. This pulse output from the shaping circuit 72 is applied to a blocking oscillator circuit indicated generally at 80 which is of conventional design and produces extremely sharp clock pulses at the output at twice the frequency of the clock signal generated by the notched wheels of the respective tape storage units.

Figure 5:
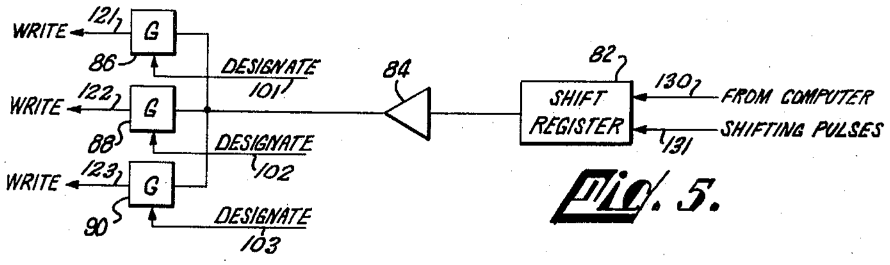
FIG. 5 is a block diagram of the information transfer and writing circuit.

As shown in FIG. 5, the pulses derived from the circuit of the pulse generator of FIG. 4 are applied over line 131 to a shifting register 82 in which groups of digits are transferred from the computer over line 130. The shifting pulses transfer digits serially out of the shifting register through an amplifier 84 to the magnetic tape writing head of a designated tape storage unit. One of a group of selection gates 86, 88, and 90 couple the output of the amplifier 84 to a designated tape storage unit, the appropriate gate being turned on by the high level produced on the appropriate Designate line.

From the above detailed description of the invention it will be apparent that recording of digital information on the tape is always synchronized with tape speed. Thus the density of recording is constant regardless of variations in the tape speed. This means that a given number of digits will always occupy the same length of tape. The problem of overlap in rewriting blocks of information on the tape is thereby avoided.

We claim:

1. Apparatus for writing digital information on magnetic tape comprising: a magnetic tape transport means having a tape drive motor, a removable magnetic tape, and disengageable coupling means for coupling said tape to said drive motor; transducer means for recording on the magnetic tape; a register for storing digital information in the form of binary bits generated at an information source; means rigidly coupled to and driven by the tape transport motor for generating pulses independently of the movement of the recording medium and having a repetition frequency determined by the rotational speed of the motor, whereby a change in tape drive speed is accompanied by a corresponding change in the pulse repetition rate; and means responsive to the pulses for transferring binary information bits from the register to the transducer means in synchronism with the pulses, whereby any changes in tape speed are accompanied by a corresponding change in the transferring rate of bits from the register onto the tape, giving a constant density of recorded bits.

2. Appaartus for writing digital information on magnetic tape comprising: a plurality of magnetic tape transport means each having a tape drive motor, a removable magnetic tape and disengageable coupling means for coupling the magnetic tape to its associated motor drive; a plurality of transducer means one associated with each magnetic tape for recording and reading digital information thereon; a register for storing digital information in the form of binary signals; a plurality of pulse generating means, each pulse generating means being rigidly coupled to and driven by a tape transport motor for generating pulses independently of the position of its associated tape, said pulses having a repetition frequency determined by the rotational speed of the associated transport motor whereby a change in the drive speed of the associated magnetic tape is accompanied by a corresponding change in the pulse repetition rate; information shifting means responsive to the pulses generated by any one of said pulse generating means for transferring binary information signals from said register to any one of said transducer means in synchronism with said pulses; first switching means for connecting said infornmation shifting means to a selected one of said transducer means; and second switching means for connecting said information shifting means to the pulse generating means of the tape transport associated with said selected transducer means.

3. Apparatus as defined in claim 2 wherein the second switching means includes integrating means for delaying the switching of pulses generated by the pulse generating means associated with the selected transducer means to the register for more than a pulse period following the disconnecting of a pulse generating means from said information shifting means.

4. Apparatus for writing digital information on magnetic tape comprising: a magnetic tape transport means having a removable magnetic tape, a tape drive motor, and coupling means for providing a disengageable friction coupling between the drive motor and the magnetic tape such that when the coupling means is energized the tape is caused to move at a speed determined by the rotational speed of the drive motor; transducer means for recording on the magnetic tape; a register for storing digital information generated at an information source; means rigidly coupled to and driven by the drive motor for generating timing pulses independently of the movement of the recording medium and having a repetition frequency determined by the rotational speed of the drive motor, whereby a change in tape drive speed is accompanied by a corresponding change in pulse repetition rate; gating means; means for applying the timing pulses to the gating means; means synchronous with the energizing of the coupling means for opening the gating means to pass timing pulses; and means responsive to the timing pulses passed by the gating means for transferring information from the register to the transducer means in synchronism with the timing pulses, whereby any changes in tape speed are accompanied by a corresponding change in the transferring rate of information from the register onto the tape, giving a constant density of recording.

References Cited in the file of this patent

UNITED STATES PATENTS

| | | |
|---|---|---|
| 2,700,148 | McGuidan et al. | Jan. 18, 1955 |
| 2,780,670 | Brewster | Feb. 5, 1957 |
| 2,796,597 | Poorte et al. | June 18, 1957 |
| 2,851,676 | Woodcock et al. | Sept. 9, 1958 |
| 2,882,518 | Buhrendorf | Apr. 14, 1959 |
| 2,886,800 | Murphy | May 12, 1959 |
| 2,886,802 | Henning et al. | May 12, 1959 |
| 2,887,674 | Greene | May 19, 1959 |